(12) United States Patent
Xu et al.

(10) Patent No.: US 8,981,749 B2
(45) Date of Patent: Mar. 17, 2015

(54) POWER CONVERTER SYSTEM FOR MOBILE DEVICES

(75) Inventors: Kai Xu, Mississauga (CA); Lyall Kenneth Winger, Waterloo (CA); Christopher David Bernard, Kitchener (CA)

(73) Assignee: BlackBerry Limited, Waterloo, CA (US)

( * ) Notice: Subject to any disclaimer, the term of this patent is extended or adjusted under 35 U.S.C. 154(b) by 742 days.

(21) Appl. No.: 13/271,570

(22) Filed: Oct. 12, 2011

(65) Prior Publication Data

US 2013/0093514 A1    Apr. 18, 2013

(51) Int. Cl.
| | | |
|---|---|---|
| G05F 1/56 | (2006.01) | |
| H02M 3/158 | (2006.01) | |
| G05F 1/565 | (2006.01) | |
| H02M 1/00 | (2006.01) | |

(52) U.S. Cl.
CPC ...... *H02M 3/1582* (2013.01); *H02M 2001/007* (2013.01)
USPC .......................................... 323/282; 323/311

(58) Field of Classification Search
USPC .................. 323/311, 282, 285, 288, 289, 259
See application file for complete search history.

(56) References Cited

U.S. PATENT DOCUMENTS

| | | | |
|---|---|---|---|
| 6,765,370 B2 | 7/2004 | Bradley | |
| 6,882,130 B2 | 4/2005 | Handa et al. | |
| 7,061,212 B2 | 6/2006 | Phadke | |
| 7,289,778 B2 | 10/2007 | Sasaki | |
| 7,466,112 B2 * | 12/2008 | Zhou et al. | ..................... 323/259 |
| 7,486,046 B2 | 2/2009 | Chou | |
| 2002/0027467 A1 | 3/2002 | Henry | |
| 2006/0221516 A1 | 10/2006 | Daboussi | |
| 2006/0267562 A1 | 11/2006 | Szepesi | |
| 2007/0108951 A1 | 5/2007 | Coleman | |
| 2008/0278136 A1 | 11/2008 | Murtojarv | |

FOREIGN PATENT DOCUMENTS

| | | |
|---|---|---|
| EP | 1366948 | 12/2003 |
| EP | 1381135 | 1/2004 |
| JP | 2000 060115 | 2/2000 |
| WO | 2006/081613 | 8/2006 |

OTHER PUBLICATIONS

Cap-XX PTY Limited, "Cap-XX Application Note No. 1004—Driving High-Power White LED Flash in Camera Phones", pp. 1-15, May 31, 2005.

(Continued)

*Primary Examiner* — Adolf Berhane
*Assistant Examiner* — Nusrat Quddus
(74) *Attorney, Agent, or Firm* — Geoffrey deKleine; Borden Ladner Gervais LLP

(57) ABSTRACT

A power converter system for managing power between a power supply and a load, the system including: a first buck-boost circuit connected to the power supply; and a capacitor provided between the buck-boost circuit and the load to buffer power supply for the load. The system may include a second buck-boost circuit between the capacitor and the load. In another embodiment, a power converter system includes: a boost circuit connected to the power supply; a buck circuit connected to the load; and a capacitor provided between the boost circuit and the buck circuit to manage the supply of power to the load.

9 Claims, 11 Drawing Sheets

(56) References Cited

OTHER PUBLICATIONS

Cap-XX PTY Limited, "Cap-XX Application Brief No. 1004—Battery Run-Time Extension and Low-Temperature Boost", Version 2, Aug. 2002.

Cap-XX PTY Limited, "Cap-XX Application Brief No. 1006, Pulsed Load Applications", pp. 1-4, Aug. 2001.

Mars, "How Supercapacitors Solve LED Flash Power Issues in High Res Camera Phones", Part 1, http://www.powermanagementdesignline.com/How May 21, 2006.

European Patent Office, Extended European Search Report for EP Patent App. No. 11184881.8, May 6, 2012.

Canadian Intellectual Property Office, Office Action for CA Patent App. No. 2,792,216, Jun. 17, 2014.

\* cited by examiner (a) Equivalent circuit of battery　　(b) waveform with pulse load

POWER CONVERTER SYSTEM FOR MOBILE DEVICES

FIELD

The present document relates generally to power regulation. More particularly, the present document relates to power conversion using circuit configurations and converters such as buck-boost converters.

BACKGROUND

Mobile electronic devices, such as personal digital assistants (PDAs), portable computers or handheld mobile phones sized or shaped to be held or carried in a human hand (such as smart phones or cellular phones), typically include a power pack that enables the mobile devices to be readily portable. A typical power pack may include one or more rechargeable batteries. Efficient use of power may enable the mobile electronic devices to operate for longer periods of time between recharging. Further, different electronic components in a mobile electronic device may utilize different levels of voltage or current.

BRIEF DESCRIPTION OF THE DRAWINGS

Embodiments will now be described, by way of example only, with reference to the attached Figures, wherein.

DETAILED DESCRIPTION

Figure 1:
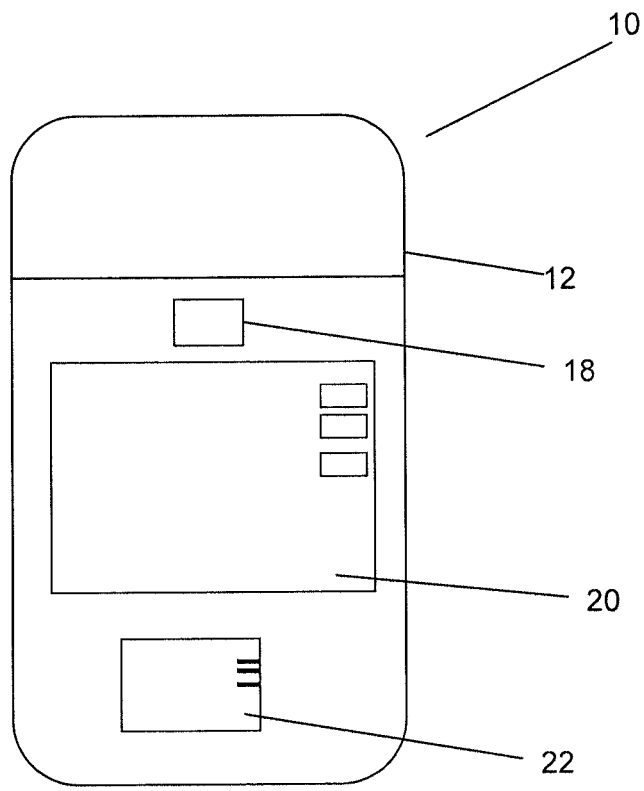
FIG. 1 is a schematic drawing of a mobile communication device.

The disclosure below proposes techniques whereby voltages or currents from a power supply or power pack may be efficiently utilized to generate different voltage levels for various electronic components in a portable electronic device. For purposes of illustration, the power pack may be represented as—and will be referred to for purposes of simplicity as—one or more batteries.

As a general matter, a portable or mobile electronic device typically includes one or more batteries that supply power to all of the electronic components in the mobile electronic device. Because of the complexity of the circuitry of many mobile electronic devices, supplying power may entail a number of challenges. For example, not all components in the mobile electronic device necessarily use the same levels of voltage or current. Further, the voltages or currents for some components ordinarily ought to be regulated so that the voltage or current stays substantially constant. Also, various activities and functions of the circuitry can affect the voltage or current levels, and the effects can be transient or for a relatively long-term. It is also a general goal to supply power efficiently so that the mobile electronic device may be used for longer time intervals without recharging or replacing the batteries. Another challenge is that many portable or mobile electronic device, are, as a matter of convenience, small (and often handheld), and therefore considerations of size and weight are often important.

An example of a challenge is the effect upon supplied power that may be caused by placing a large load on the battery. The voltage supplied to various loads including, for example, one or more power amplifiers (PAs), can be adversely affected by the battery's equivalent series resistance (ESR), which is generally an indication of inefficiency and waste of power. Generally speaking, the greater a battery's ESR, the less efficiently the battery is operating. In some cases, a battery may operate below its efficiency, such that the voltage to the loads may drop below preferred or specified operating levels for those particular loads. When more current is drawn for more loads, the voltage drop may increase even further. For example, the PA typically specifies a minimum voltage to operate (e.g. 3.4V) and a large voltage drop or droop can impact the PA. The impact on the PA means in impact upon device functionality. In the case of a cellular phone, for example, an impact on the PA may mean a reduction in talk time. As discussed below, the ESR effect of the battery may cause the battery terminal voltage to be less than the cell voltage. The higher the current drawn from the system (other loads) and PA, the less voltage is left on the terminal. In some cases, the battery capacity may not be fully utilized. In particular, there are situations where the ESR of the battery may prevent the whole capacity of the battery from being available for use.

To address at least some of the issues identified above, the present disclosure describes embodiments in which a power supply/power pack for a mobile electronic device can supply power at a plurality of regulated voltages or currents to electronic components, and have the voltages or currents supplied in an efficient manner. In one embodiment, a power converter system/circuit separates at least one load from the battery and other components (i.e., other loads) of the mobile device in order to attempt to overcome the effects of ESR and reduce the impact of one load upon another. In particular, the embodiments include a bias and driving scheme that is intended to improve performance, for example, by isolating a load, such as a power amplifier, from the battery, while still providing sufficient power.

According to one aspect herein there is provided a power converter system for managing power between a power supply and a load, the system comprising: a first buck-boost circuit connected to the power supply; and an energy storage element, which will be illustrated as a capacitor, connected between the buck-boost circuit and the load. According to context, two elements are "connected" in the sense of being electrically connected, such that a current from one may flow to the other. Electrically connected elements need not be proximate to one another, nor do they need to be physically or directly connected to one another. For example, two elements may be connected if current can flow from one to the other via an intermediate element, such as a resistor or diode.

According to another aspect herein there is provided a power converter system for managing power between a power supply and a load, the system comprising: a first buck-boost circuit having an input and an output, the input of the first buck-boost circuit connected to a positive terminal of the power supply, the output connected to the load; and a capacitor having a first terminal and a second terminal, the first terminal connected to the output of the first buck-boost circuit and the second terminal connected to a circuit ground.

In a particular case, the system may include a second buck-boost circuit connected between the capacitor and the load. In a particular example, the second buck-boost circuit may have an input and an output wherein the input of the second buck-boost circuit is connected to the output of the first buck-boost circuit and the first terminal of the capacitor, and the output of the second buck-boost circuit is connected to the load.

Also, in this particular case, the system may further include a bypass of the first buck-boost circuit connecting the power supply to the output of the second buck-boost circuit or the load. The bypass may include a switching element that can be conductive or nonconductive, wherein the switching element comprises a first terminal and a second terminal, wherein the first terminal of the switching element is connected to the positive terminal of the battery and the second terminal of the switching element is connected to the output of the second buck-boost circuit. In this case, the bypass may be configured to be conductive when the power source is below a threshold voltage. The threshold voltage may be fixed (e.g., approximately 3.8 V) or may vary as a function of any number of factors.

Typically the power converter system will be placed between a power source such as a battery and a pulsed load such as a power amplifier.

In some cases, the capacitor may be a supercapacitor. The supercapacitor may have capacitance in the range of at least approximately 5 mF or alternatively at least approximately 200 mF or, in another case, of between approximately 200 mF to 500 mF. In some cases, the capacitor may comprise two or more capacitors of any capacitance, such as two or more capacitors (not necessarily supercapacitors) connected in parallel.

According to another aspect herein, there is provided a power converter system for managing power between a power supply and a load, the system comprising: a boost circuit connected to the power supply; a buck circuit connected to the load; and a capacitor provided between the boost circuit and the buck circuit. As a particular example, the power converter system may include: a boost circuit having an input and an output, the input connected to a positive terminal of the power supply; a buck circuit having an input and an output, the input connected to the boost circuit and the output of the buck circuit connected to the load; and a capacitor having a first terminal and a second terminal, the first terminal connected to the boost circuit and the buck circuit between the boost circuit and the buck circuit and the second terminal of the capacitor connected to a circuit ground.

In a particular case, the capacitor may have a capacitance of between approximately 200 nF and 500 nF.

Embodiments of the power converter system described herein may be particularly useful in mobile devices, such as smart phones, cellular phones, media players and the like. Some embodiments may address the challenges identified above.

Other aspects and features of the present disclosure will become apparent to those ordinarily skilled in the art upon review of the following description of specific embodiments in conjunction with the accompanying figures.

Generally speaking, the present disclosure provides embodiments of power converter systems and methods including circuitry to electrically isolate a load from a power source such as a battery. In general, isolating a load entails making the process of supplying power to that load less sensitive to power usages by other elements, and causing the supplying of power to that load to have less effect upon those other elements. In some embodiments, a buck-boost converter is connected to the power source and is used to charge a capacitor or supercapacitor in order to provide an appropriate voltage to a load such as a power amplifier (PA). In this case, the buck-boost converter (called a charger in this case) acts as a buffer between the supercapacitor and the battery. In some embodiments, the supercapacitor can then provide an input to a second buck-boost converter, which may provide a further DC-DC conversion, to supply the load with power. In the present document, the buck-boost circuit may be referred to as a "converter", "charger" and "switcher" in order to indicate the intended functionality but the circuit will be as known to one of skill in the art. Further, the buck, boost or buck-boost circuits may be of any configuration, and may use any kinds or any numbers of switching elements.

In the embodiments herein, the load is typically described as a power amplifier; however, it will be understood that the embodiments may be used to isolate other voltage sensitive loads or components. It will further be understood that although a battery is referred to in the figures, the battery may be any appropriate power source and may include multiple batteries or fuel cells or combinations thereof.

Turning to FIG. 1, a simplified back view of a mobile electronic device—in this example, a mobile communication device such as a cellular telephone or a smart phone capable of voice and data communications—is shown. The mobile communication device (10) has a body (12), which is shown without a back panel. It will be understood that the mobile communication device includes a processor (18) and a battery (20). The processor (18) may control most or all of the operations of the device (10), and may comprise one element or several elements. The processor (18) may control one or more switching elements as described below; the switching elements may also be controlled by other controlling elements. The battery (20) may or may not be removable and may or may not be rechargeable. The mobile communication device may further include a SIM card or SD card holder (22). As will be further understood by one skilled in the art, the mobile communication device (10) includes various other parts, which are not shown in FIG. 1. Examples of other typical components are a display, which consumes power when presenting information to a user, and a camera, which may consume power when generating a flash or taking a photograph. Generally speaking, battery (20) may operate as a power supply for all of the electronic components in the mobile communication device (10). Mobile communication device (10) may send or receive messages via any of several wireless communication networks, such as a Global System for Mobile Communications (GSM) network or a Wideband Code Division Multiple Access (WCDMA) network.

Figure 2:
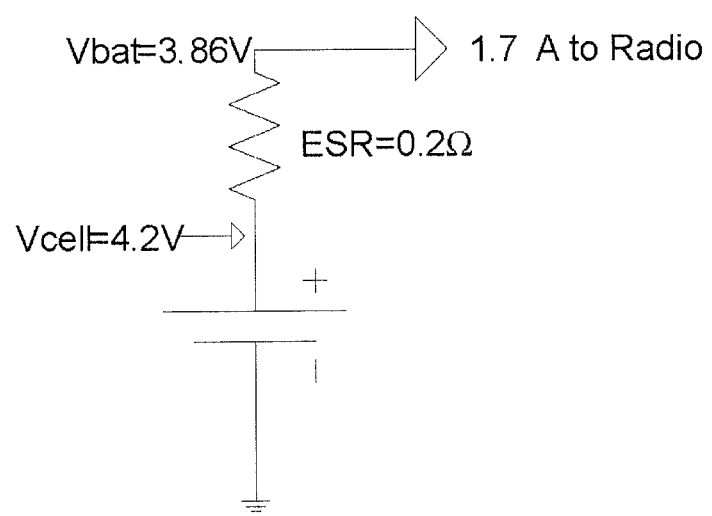
FIG. 2 is a simplified circuit model illustrating the phenomenon of battery voltage drop.

FIG. 2 illustrates a conventional battery ESR effect (without the effect of the power management system, which will be described in more detail below) where the battery voltage is 4.2 V, ESR of the battery is 0.2 ohm and is modeled as a resistor. In this case, the transmission current available to the load in question, that is, the radio PA is 1.7 A. The voltage drop due to 1.7 A passing through the ESR is (1.7 amperes) (0.2 ohms)=0.34 volts, so only 3.86 volts (4.2−0.34=3.86) is actually available for use (or the effective voltage at the positive terminal, with respect to circuit ground, is 3.86 volts). As illustrated, the ESR of the battery can reduce battery capacity. Also, as indicated previously, the PA is often not the only electrical load that demands, and to which the battery will supply, power. When considering other loads in the device, such as, for example, the processor or the display or the like, the voltage drop, sometimes referred to as a "voltage droop," may be even larger. The impact of voltage drop can impact the ability to adequately power the PA, resulting in less talk time as battery capacity available to the PA may be less than required for transmission.

Figure 3:
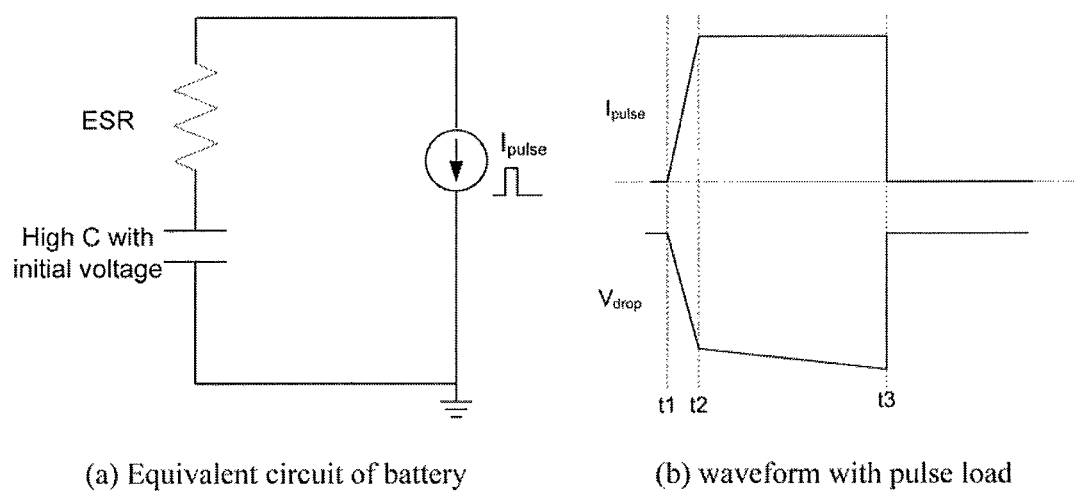
FIG. 3A illustrates a simplified circuit model for a battery.
FIG. 3B illustrates a reaction to a pulse load of the battery modeled in FIG. 3A.

FIG. 3A shows an equivalent circuit of the battery in which a resistor in series with a high-capacitance capacitor simulates the battery (again, without the effect of the power management system), and FIG. 3B shows a waveform of the battery voltage under a current pulse, modeled as a constant current element. When a current pulse is applied to (or demanded from) the battery, the voltage drop caused by battery ESR is in phase with the current pulse, corresponding to the time from t1 to t2. The pulse current then discharges the battery capacitance and causes the voltage drop as shown from t2 to t3. For a wireless voice transmission (e.g., GSM) application, the voltage drop caused by the ESR may be dominant and a drop caused by the capacitance discharged may be negligible. In the case of a longer current pulse, however, such as a camera flash, the amount of voltage drop during the capacitance discharging could be comparable with the ESR effect. This kind of drop may be dominant at low temperatures where the capacitance of the battery can be reduced. In other words, the power demands of various electronic components, acting in combination with the ESR and other factors, can adversely affect power supplies to loads, and in particular, can adversely affect the power supplied to a PA.

Figure 4:
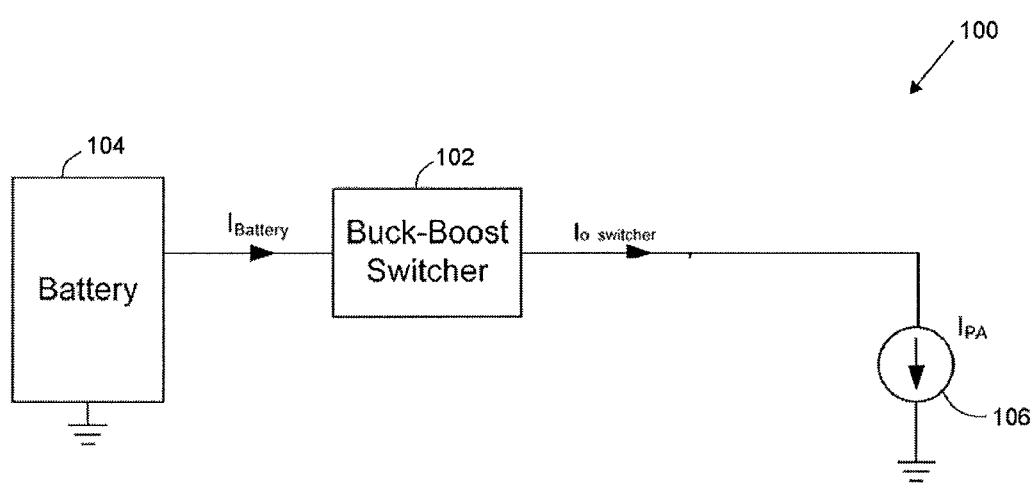
FIG. 4 illustrates a power converter system including a buck-boost converter according to one embodiment herein.

FIG. 4 illustrates an effect of adding a part of the power management system. In FIG. 4, a power converter system (100) includes a buck-boost converter (102), sometimes referred to as a buck-boost switcher, located between a power source, such as a battery (104), and a load, such as a PA (106). In this case, the positive terminal of the battery (104) is connected to an input of the converter (102), and the output of the converter is connected to the load PA (106). The buck-boost switcher (102) is can improve the conversion efficiency compared to linear conversion (as was illustrated above). As an example, the effective battery voltage may be (for example) 3.86 V, and the voltage required to deliver the maximum power to the PA may be (for example) about 3.4 V. When the battery voltage is higher than 3.4 V, the converter (102) works as a buck converter. When the battery voltage is lower than 3.4V, a pass-through or bypass function may be activated. For example, the PA (106) is supplied by the battery (104) through a fully turned on MOSFET (not shown) that effectively by-passes the converter (102). When the required PA (106) voltage is lower still (for example, the PA may at some times need to operate at maximum power and may therefore operate at less than 3.4 V), the buck-boost converter (102) may vary the output voltage to meet the requirement of the load.

This approach can, to some degree, adjust the output voltage according to the demand of the PA (106) or other loads. Also, this approach may improve overall efficiency, although there is a potential for reduced efficiency under some conditions. Also, the ripple of a switched converter may be problematic for some loads.

Figure 5:
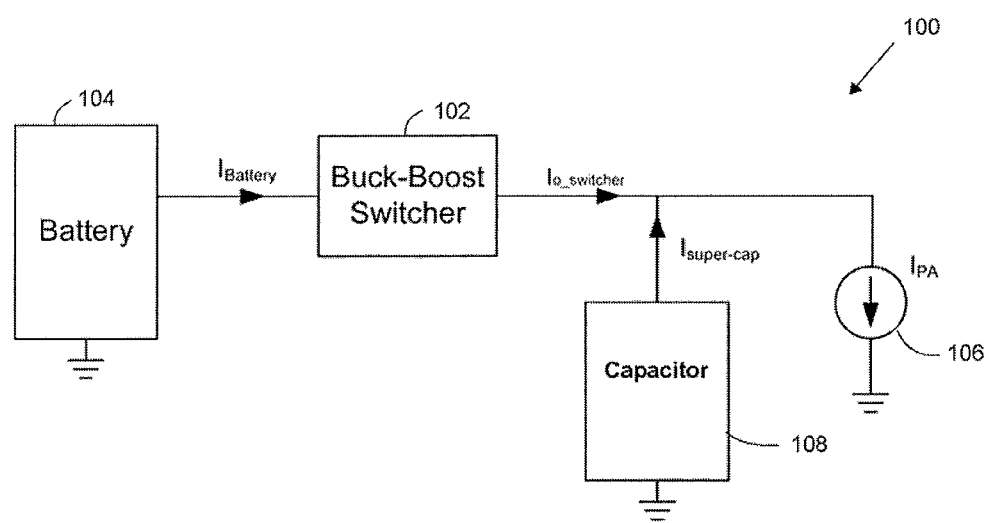
FIG. 5 illustrates a power converter system including a buck-boost converter and supercapacitor according to another embodiment herein.

Accordingly, as shown in FIG. 5, another example circuit combines the buck-boost converter (102) of FIG. 4 with an energy storage element, illustrated as a capacitor (108), connected between the buck boost converter (102) and the PA (106). Similar to FIG. 4, the positive terminal of the battery (104) is connected to an input of the converter (102), and the output of the converter is connected to the load PA (106). The connection of the capacitor is not in series such that substantially all current from the output of the converter (102) is directed to the capacitor (108); rather, as depicted in FIG. 5, a first terminal of the capacitor is electrically connected to the output of the converter (102) and a second terminal of the capacitor is connected to another electrical node, such as circuit ground. Circuit ground, which is generally a reference node against which other voltages are relative, may be, but is not necessarily, Earth potential. For convenience, it may be said that one terminal of the capacitor (102) is connected to the output of the converter (102) and the other terminal of the capacitor (102) is connected to circuit ground, recognizing that "connected to circuit ground" may mean, but does not necessarily mean, connected directly to circuit ground. In this case, the capacitor is a supercapacitor (or "supercap") in the range of approximately 200 mF-500 mF. A supercapacitor may realize a potential benefit of high capacitance with a modest size and weight. With high capacitance, the capacitor (106) tends to resist voltage changes at the output of the converter (102), and the capacitor (108) and converter (102) may cooperate to supply current to the PA load (106). As a result, the capacitor (108) helps buffer the load, PA (106), from the power source, battery (104). Thus, for example, a PA transmission may have less impact on other circuits (not shown) that are also powered by the battery (104). Notably, in some embodiments, a switched converter itself may include a high-capacitance capacitor or a supercap, but for purposes of illustration and explanation, the capacitor (108) is depicted as a separate component.

In FIG. 5, the supercapacitor (108) can handle a large portion of the PA current. In this example, the buck-boost converter (102) functions as a current source that helps supply current during the PA transmission (resulting in less voltage drop on the supercapacitor), and that charges the supercapacitor (108) during non-transmission periods.

Figure 6:
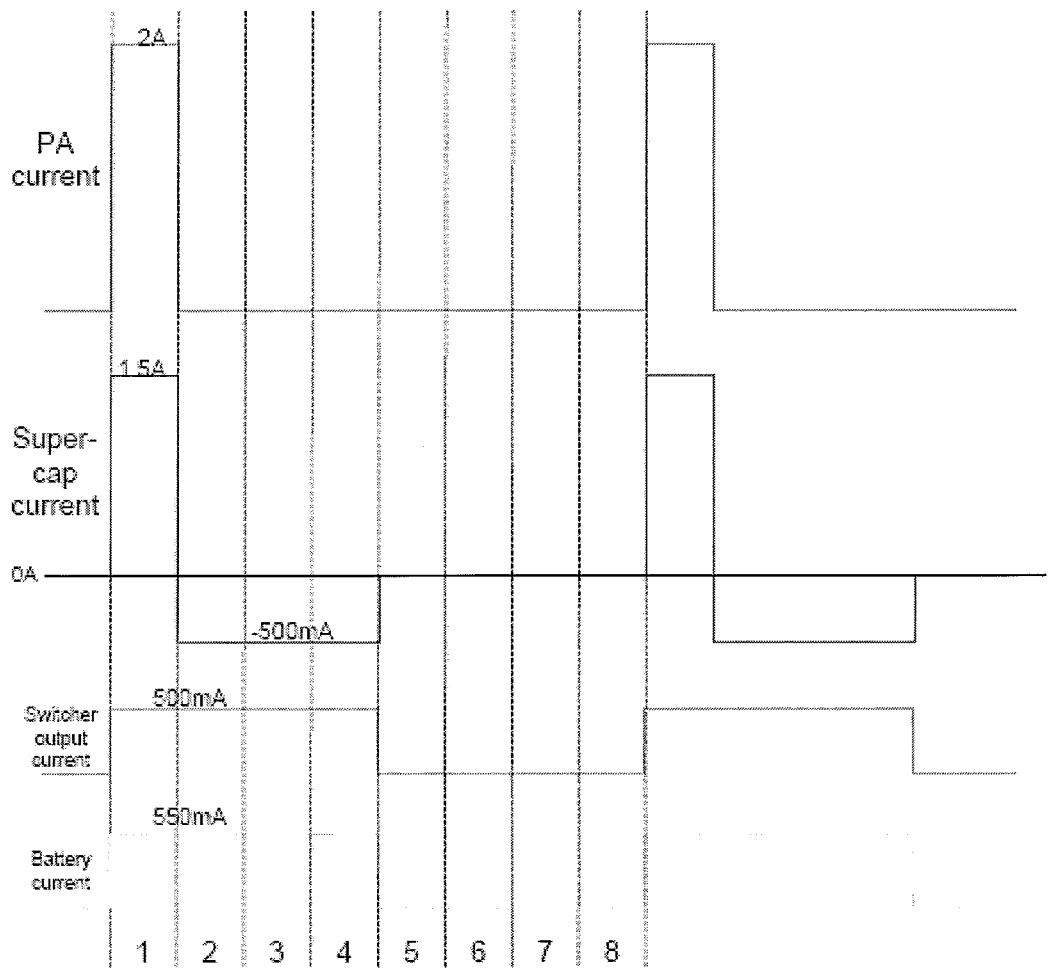
FIG. 6 illustrates waveforms generated according to the embodiment of FIG. 5.

Using one slot transmission of the PA (106) as an analysis case, FIG. 6 shows simplified current waveforms on PA (106), buck-boost converter (102), supercap (108) and battery (104). A current level of the buck-boost converter (102) is selected so that the buck-boost converter (102) is able to charge the supercapacitor (108) during non-transmission periods before the next PA transmission. In this example 500 mA is selected. At slot 1, the buck-boost converter (102) supplies the current for the PA (106) so that current drawn from the supercapacitor (108) drops to 1.5 A. During the next 3 slots, the buck-boost converter (102) charges the supercapacitor (108). The current reflected to the battery (104) is larger than the output current and is estimated at 550 mA, if 90% efficiency is used. It will be understood that this simple example shows the full recharging of the supercapacitor but it will be understood that the recharge will be based on time between transmits and the like.

Comparing the currents of the PA (106) with the battery current, the battery current is buffered and averaged out by the buck-boost converter (102) and supercapacitor (108), which may result in flat battery discharge current instead of high pulse current in the system. As a result, the ESR of the battery should have less impact on the system and, accordingly, the battery life can be extended. Also, a larger amount of battery capacity may be used.

At 500 mA current level, it is possible to utilize a buck-boost converter (102) with 90% to 94% efficiency because efficiency is higher at lower current levels. Also the size of the buck-boost converter (102) may be designed to be small, for example, about 1.96 mm by 1.48 mm. An inductor used in this circuit could also be small and is intended to be squeezed into, for example, a 2 mm by 2 mm package. Miniaturization may be beneficial for small mobile electronic devices in general and handheld devices in particular.

As an experiment of the above embodiment, two battery discharge cases were tested in a battery test machine. One case simulated a standard GSM discharge pulse with (2 A)(0.6 mS)+(0.1 A)(4 mS) on a conventional system. The other case simulated a power converter system including a buck-boost switcher and supercap (as in FIG. 5) with (0.6 A)(2.4 mS)+(0.1 A)(2.2 mS). Total energy taken from the battery was about the same. The cut off voltage for the conventional system was 3.3 V, but was 3 V for the power converter system. The result is approximately 7 minutes battery life saving, which may amount to approximately 4%-5% of total talk time. Notably this simulation assumed a battery that operated in a voltage range of 3.5 V or more, and for batteries that use reduced voltage ranges (such as voltages around 2.5 V), this system may provide an even greater increase in talk time. It has been proposed that a PA may be biased at higher voltages than discussed previously. It has been suggested, for example that a PA biased at 5 V can significantly increase the PA efficiency. Notably, the concepts described herein are adaptable not only to systems with power supplies with different voltage ranges, but also to systems that have loads that have different demands. Further, the concepts may be capable of handling large and rapidly changing voltage levels. One potential drawback, however, is that having a capacitor at the load side (depicted in FIG. 5 as the capacitor (108) and PA (106) sharing a node) may prevent fast transition of supply voltage to the load. In other words, if the voltage demands of the PA (106) change, the capacitor (108) may resist that change.

Figure 7:
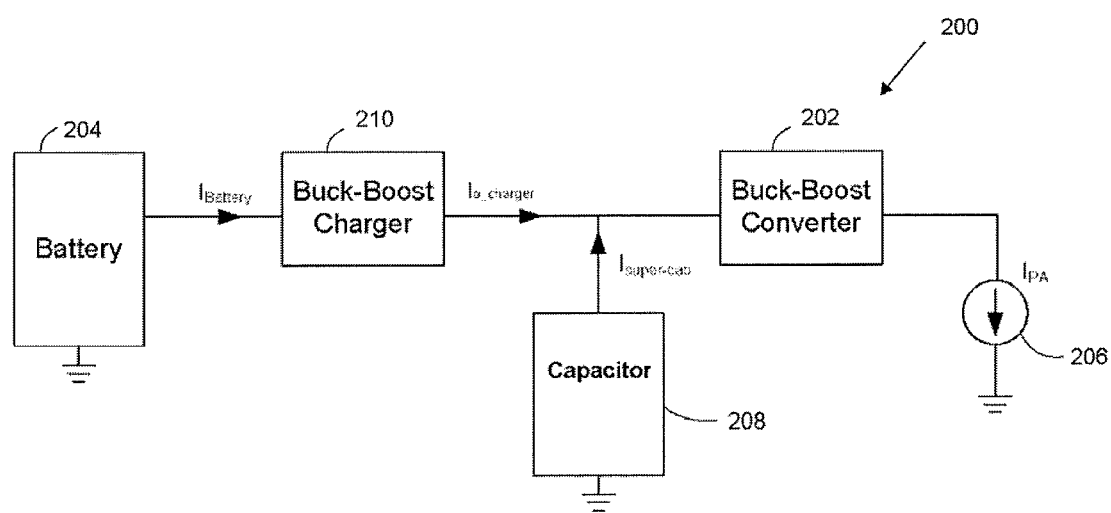
FIG. 7 illustrates another power converter system according to another embodiment herein.

FIG. 7 shows another embodiment of a power converter system (200). This system may be useful for, e.g., 2G and 3G PA (sometimes called hybrid PAs) or other loads. This embodiment may enable more rapid changes in the voltage supplied to the PA load (206). Similar to the embodiment of FIG. 5, a power source is shown as a battery (204) and a load is shown as a power amplifier (PA) (206). The positive terminal of the battery (204) is connected to an input of a buck-boost charger (210) (described below) and the output of the charger (210) is connected to the input of a buck-boost converter (202). The output of the buck-boost converter (202) is connected to the load PA (206). One terminal of the capacitor (206) is connected to the output of the buck-boost charger (210) and the input of the buck-boost converter (202), and the other terminal of the capacitor (208) is connected to circuit ground.

In this configuration, the buck-boost converter (202) can improve rapid transition of voltages supplied to the PA load (206). A buck-boost charger (210) acts as a current source to buffer the PA (206) current so that the current at the battery (204) may remain roughly constant with a lower current level. In this case, a high ripple voltage may be noticed at the input of the buck-boost converter (202). The capacitor (208), which resists voltages changes, may reduce this ripple. In another variation, the buck-boost converter (202) may be designed to handle this high ripple by using a feed forward loop in the design. With this feature, the capacitor (208) capacitance can be decreased to a 5 mF to 10 mF level. The physical size of the capacitor (208) can thereby be smaller. Also the ESR of the capacitor (208) may be of lesser concern in the system (200) of FIG. 7, which may allow the capacitor to be further reduced in size.

Figure 8:
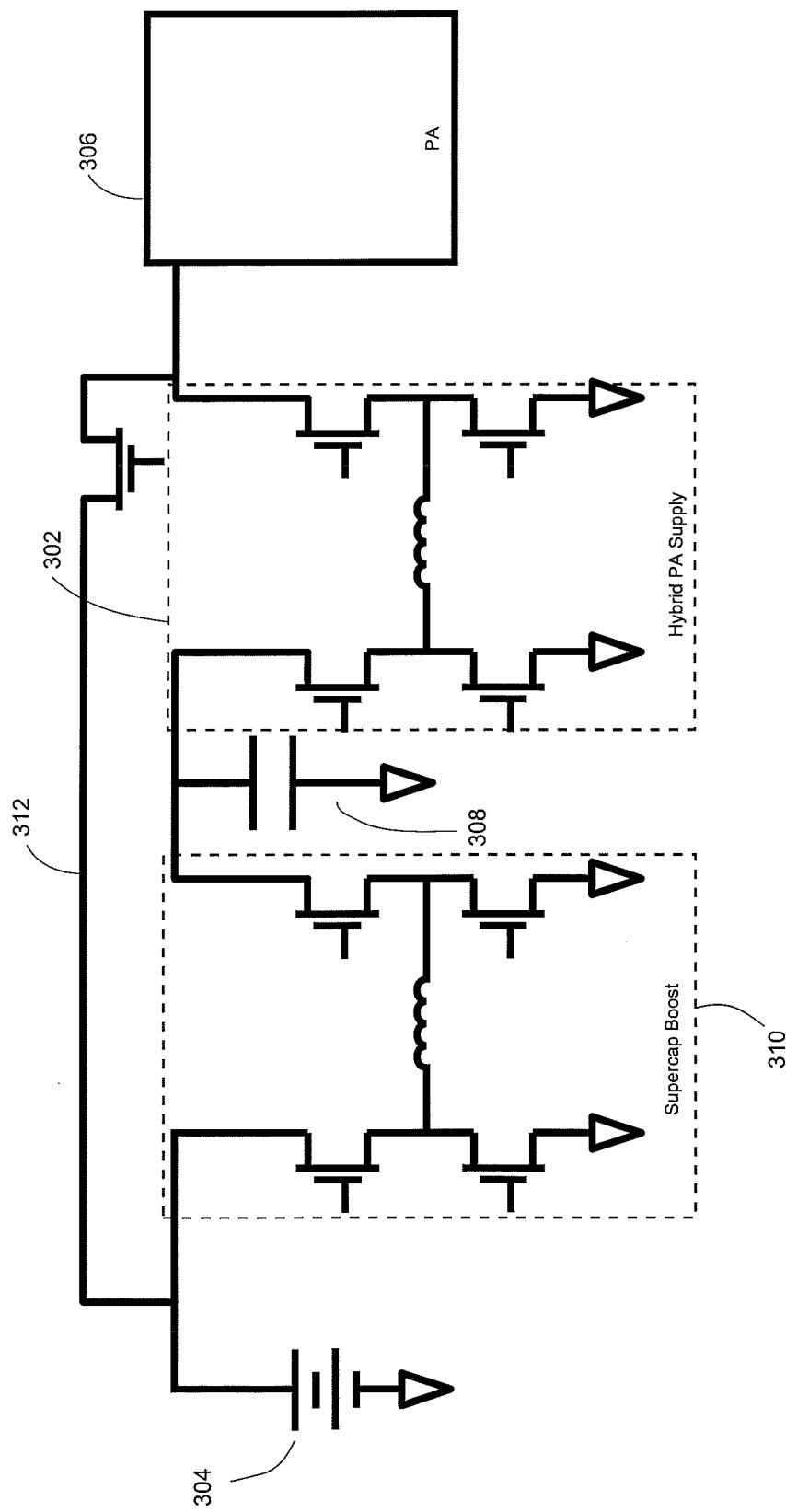
FIG. 8 illustrates an illustrative and more detailed implementation of circuits in the embodiment of FIG. 7.

FIG. 8 shows additional detail of an illustrative circuit based on the block diagram shown in FIG. 7. In particular, a battery (304) is connected to a buck-boost charger (310) that is connected with a capacitor (308) and a buck-boost converter (302). The buck-boost converter (302) is connected to the load, that is, power amplifier (306). When the buck-boost charger (310) is operating in boost mode, the buck-boost charger (310) operates to supply an average current substantially equal to the average current required for the operation of the hybrid PA (306).

Further, the buck-boost converter (302) may run from the battery (304) directly, through a bypass (312), using transistor Q1 as the high side field effect transistor (FET), when the battery (304) voltage is sufficiently high for the buck-boost converter (302) to maintain an output voltage sufficient to power the hybrid PA (306). Bypass 312 includes a switching element that has one terminal connected to the positive terminal of the battery (304) and another terminal connected to the output of the buck-boost converter (302) and to the load PA (306). The transistor Q1 is an example of a controllable switching element that can enable or disable the bypass by allowing current to conduct or not. The transistor Q1 can be turned on (made conductive) or off (made non-conductive), thereby enabling or disabling bypass (312), under the control of a component such as processor (18). When the hybrid PA (306) voltage is higher than a voltage that can be supplied by the buck-boost converter (302) operating through the battery (304) by way of the bypass (312), the power converter system (300) may adapt to allow the buck-boost converter (302) to be supplied through the buck-boost charger (310). Having the buck-boost converter (302) supplied from the buck boost charger (310), the capacitor (308), or both may allow for higher voltage to be supplied. Although this power supply option may reduce the overall efficiency, delivering further power in this manner may enable higher output power to be delivered to the hybrid PA (306) even with a low-voltage battery source.

In this embodiment, the placement of the capacitor (308) in a GSM PA or hybrid PA solution may increase the efficiency for the GSM PA or hybrid PA (and for other PAs in other wireless systems as well). For example, FIG. 8 illustrates a power converter system (300) that may be suitable for use with a hybrid PA used for both WCDMA and GSM technologies.

Figure 9:
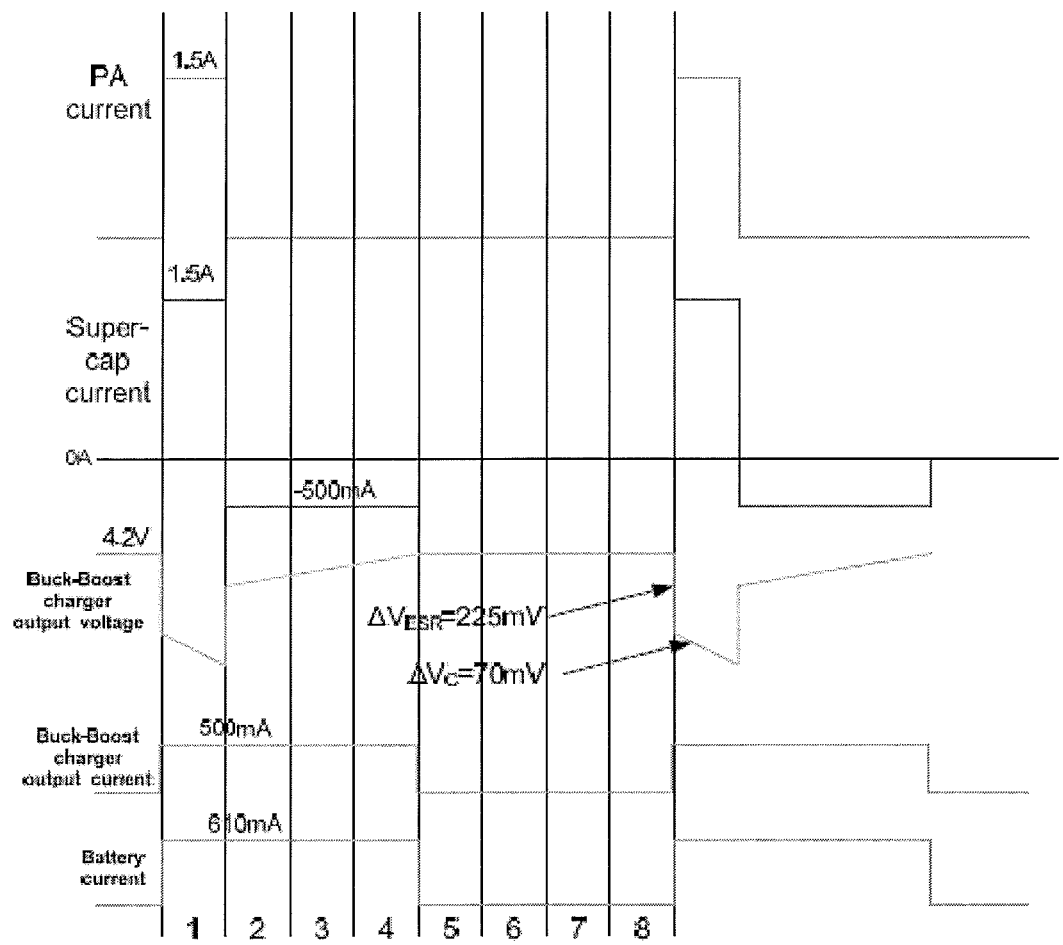
FIG. 9 illustrates the waveforms for the power converter system of FIG. 8 with 1 slot transmitting.
Figure 10:
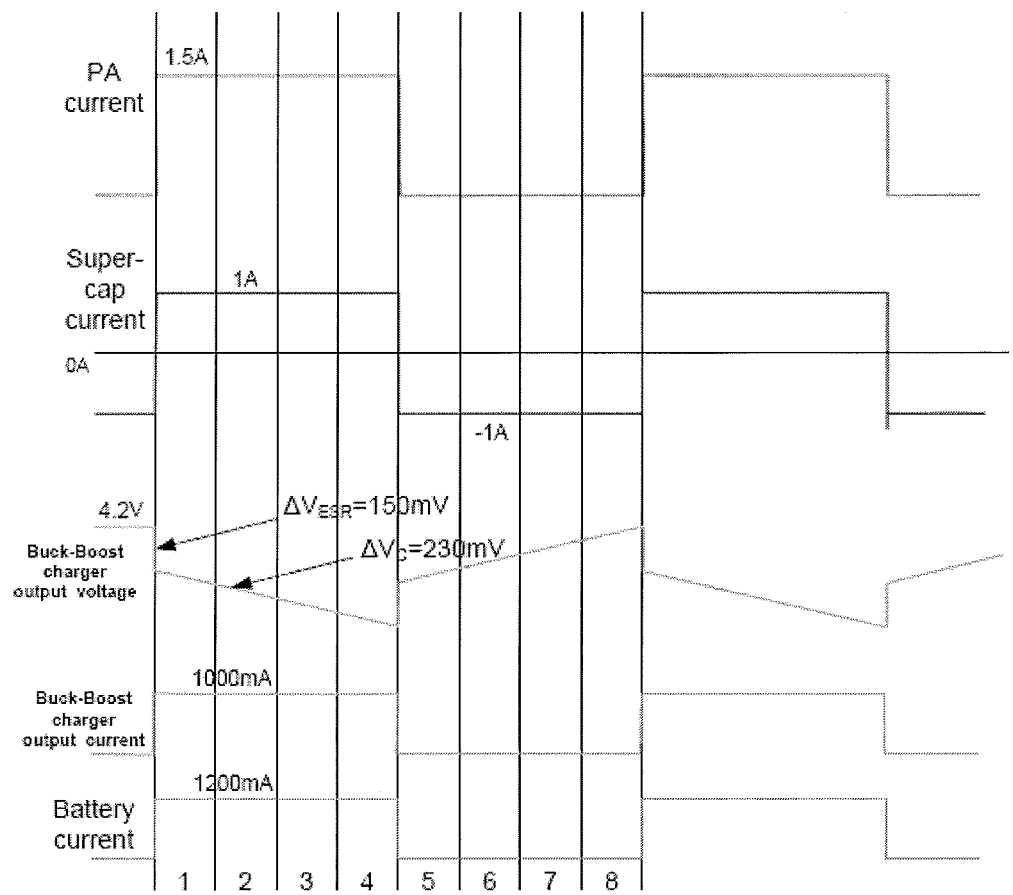
FIG. 10 illustrates the waveforms for the power converter system of FIG. 8 with 4 slot transmitting.

FIG. 9 and FIG. 10 show the current and voltage waveforms of the power converter system with 1 slot and 4 slot transmitting. The PA Vcc (supply) voltage is 5 V with 1.5 A current draw, buck-boost charger voltage is set at 4.2 V, battery voltage is 3.8 V, 90% efficiency is used for both charger and converter. For these figures, the capacitor's parameters were set at 10 mF capacitance and 150 m ohm for ESR. For the case where battery voltage is high and PA current is low, for example a 3G PA, the buck-boost charger provides a bypass function that may increase total efficiency as the buck-boost converter is working in buck mode. As the output of the buck-boost charger may be relatively constant, the buck-boost converter may have a substantially constant ratio between input and output. The circuit has a very high efficiency. Current stress on both the buck-boost charger and converter can be distributed.

Figure 11:
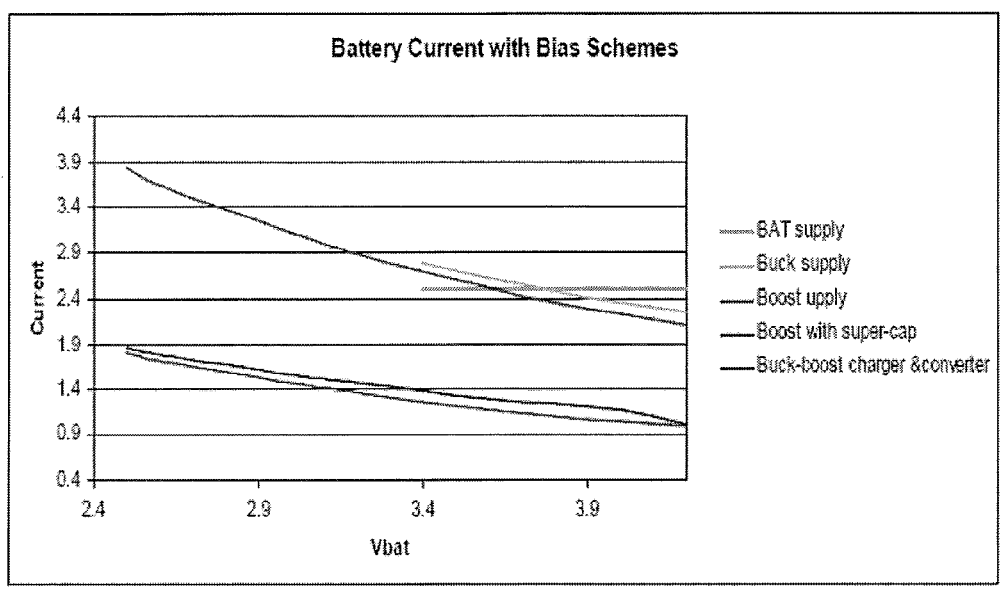
FIG. 11 is a graphical representation of battery current with various bias schemes.

FIG. 11 compares the battery currents between different driving schemes described above. It can be seen that the current on the battery side for buck-boost charger and converter approach is much smaller than the buck-boost converter approach.

Figure 12:
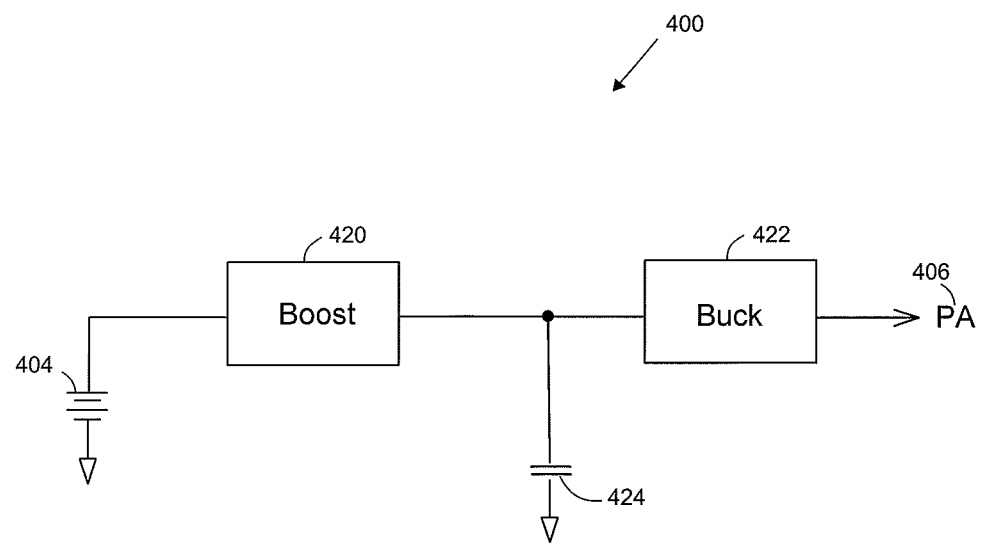
FIG. 12 illustrates a further power converter circuit according to another embodiment herein.

A further embodiment is shown in FIG. 12, in which the boost mode is separated from the buck mode. Similar to the above, a power converter system (400) is shown being powered by a battery (404) to supply power to a load, that is, a PA (406). In this embodiment, a boost converter (420) is configured to supply a very high voltage, for example, in the range of 100-200 V at a constant current to a capacitor (424). An input of the boost converter (420) is connected to the battery (404) and the output of the boost converter (420) is connected to a first terminal of the capacitor (424). A second terminal of the capacitor (424) is connected to a circuit ground (as described above). The use of a high voltage, constant current allows the use of a smaller capacitor, both in capacitance and in size, than capacitors as used in the embodiments above. For example, a capacitor approximately in the range of 200 nF-500 nF may be used (such capacitors are not conventionally referred to as supercaps). Such capacitors have a physical size of approximately 5 mm by 3 mm. This is in comparison to supercapacitors of the type mentioned above that can be in the range of 20 mm by 20 mm. The high voltage is then provided to a buck converter (422), that is, the output of the boost converter (420) and the first terminal of the capacitor (420) are connected to an input of the buck converter (422). An output of the buck converter (422) is connected to the PA (406) to supply the appropriate voltage to the PA (406). In this case, the capacitor (424) provides the stored voltage to handle transmit peaks.

Implementation of one or more embodiments may realize one or more advantages, some of which have been discussed already. The embodiments, although useful for mobile communication devices, may have applicability to other devices as well, and may be flexibly adapted to meet a range of applications with a range of currents or voltages.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A power converter system for managing power between a power supply and a load, the system comprising:
    a first buck-boost circuit having an input and an output, the input of the first buck-boost circuit connected to a positive terminal of the power supply;
    a capacitor having a first terminal and a second terminal, the first terminal connected to the output of the first buck-boost circuit and the second terminal of the capacitor connected to a circuit ground;
    a second buck-boost circuit having an input and an output, the input of the second buck-boost circuit being connected to the output of the first buck-boost circuit and the first terminal of the capacitor, and the output of the second buck-boost circuit being connected to the load; and
    a bypass comprising a switching element that can be conductive or nonconductive, wherein the switching element comprises a first terminal and a second terminal, wherein the first terminal of the switching element is connected to the positive terminal of the power supply and the second terminal of the switching element is connected to the output of the second buck-boost circuit.

2. A power converter system according to claim 1 wherein the power supply is a battery.

3. A power converter system according to claim 1 wherein the load is a power amplifier.

4. A power converter system according to claim 1 wherein the capacitor has a capacitance of at least 5 mF.

5. A power converter system according to claim 1 wherein the capacitor has a capacitance of at least 200 mF.

6. A power converter system according to claim 1 wherein the bypass is configured to be conductive when the power source is below a threshold voltage.

7. A mobile device comprising:
    a power supply;
    a load; and
    a power converter system for managing power between the power supply and the load, the power converter system comprising:
        a first buck-boost circuit having an input and an output, the input of the first buck-boost circuit connected to a positive terminal of the power supply;
        a capacitor having a first terminal and a second terminal, the first terminal connected to the output of the first buck-boost circuit and the second terminal of the capacitor connected to a circuit ground;
        a second buck-boost circuit having an input and an output, the input of the second buck-boost circuit being connected to the output of the first buck-boost circuit and the first terminal of the capacitor, and the output of the second buck-boost circuit being connected to the load; and
        a bypass comprising a switching element that can be conductive or nonconductive, wherein the switching element comprises a first terminal and a second terminal, wherein the first terminal of the switching element is connected to the positive terminal of the power supply and the second terminal of the switching element is connected to the output of the second buck-boost circuit.

8. A power converter system according to claim 1 wherein the capacitor is a supercapacitor configured to isolate the load from the power supply by buffering the power supplied to the load.

9. A mobile device according to claim 7 wherein the capacitor is a supercapacitor configured to isolate the load from the power supply by buffering the power supplied to the load.

* * * * *